(12) United States Patent
Chiang et al.

(10) Patent No.: US 7,383,322 B2
(45) Date of Patent: *Jun. 3, 2008

(54) SYSTEM AND METHOD FOR REPRESENTING MFS CONTROL BLOCKS IN XML FOR MFS-BASED IMS APPLICATIONS

(75) Inventors: Chenhuei J. Chiang, San Jose, CA (US); Shyh-Mei F. Ho, Cupertino, CA (US); Benjamin Johnson Sheats, Berkeley, CA (US); Eddie Raymond Yep, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/494,017

(22) Filed: Jul. 12, 2006

(65) Prior Publication Data

US 2006/0265478 A1 Nov. 23, 2006

Related U.S. Application Data

(63) Continuation of application No. 10/440,779, filed on May 19, 2003, now Pat. No. 7,130,893.

(51) Int. Cl.
*G06F 13/00* (2006.01)
(52) U.S. Cl. .................. 709/219; 709/246; 707/10
(58) Field of Classification Search ............... 709/217, 709/219, 223, 230, 246; 707/4, 10
See application file for complete search history.

(56) References Cited

U.S. PATENT DOCUMENTS 4,740,783 A  4/1988  Lawrence et al.
5,761,656 A  6/1998  Ben-Shachar
5,781,739 A *  7/1998  Bach et al. ................. 709/227

(Continued)

FOREIGN PATENT DOCUMENTS

JP    2001273177    10/2001

(Continued)

OTHER PUBLICATIONS

Hofstetter, The Future's Future: Implications of Energing Technology for Special Education Program Planning, Journal of Special Education Technology, Fall 2001, vol. 16, p. 7.

(Continued)

*Primary Examiner*—Viet D. Vu
(74) *Attorney, Agent, or Firm*—John L. Rogitz

(57) ABSTRACT

A system and method for representing MFS control blocks in XML for MFS-based IMS applications utilizes an MFS XML adapter and an MFS XML repository to translate between XML and MFS. The repository contains XML files for DOF/MOD and XML files for DIF/MID. When an XML request is received, the XML request is transformed to a byte stream by retrieving the relevant information from the MFS XML repository. The byte stream can then be placed in an IMS message queue to await processing by an MFS-based IMS application program. A byte stream response is generated by the MFS-based IMS application and is transformed into an XML response, again, by retrieving the relevant information from the MFS XML repository.

4 Claims, 3 Drawing Sheets

U.S. PATENT DOCUMENTS

| | | | |
|---|---|---|---|
| 5,870,549 A | 2/1999 | Bobo, II | |
| 5,899,975 A | 5/1999 | Nielsen | |
| 5,960,200 A | 9/1999 | Eager et al. | |
| 6,128,622 A | 10/2000 | Bach et al. | 707/103 |
| 6,141,660 A | 10/2000 | Bach et al. | |
| 6,212,550 B1 | 4/2001 | Segur | 709/206 |
| 6,243,737 B1 | 6/2001 | Flanagan et al. | |
| 6,250,309 B1 | 6/2001 | Krichen et al. | |
| 6,253,200 B1 | 6/2001 | Smedley et al. | |
| 6,256,676 B1 | 7/2001 | Taylor et al. | |
| 6,259,447 B1 | 7/2001 | Kanetake et al. | |
| 6,289,382 B1 | 9/2001 | Bowman-Amuah | |
| 6,446,110 B1 | 9/2002 | Lection et al. | 709/203 |
| 6,453,343 B1 | 9/2002 | Housel et al. | |
| 6,507,856 B1 | 1/2003 | Chen et al. | |
| 6,507,857 B1 | 1/2003 | Yalcinalp | |
| 6,510,466 B1 | 1/2003 | Cox et al. | |
| 6,519,617 B1 | 2/2003 | Wanderski et al. | |
| 6,535,896 B2 | 3/2003 | Britton et al. | |
| 6,560,639 B1 | 5/2003 | Dan et al. | |
| 6,589,291 B1 | 7/2003 | Boag et al. | |
| 6,591,272 B1 | 7/2003 | Williams | |
| 6,601,071 B1 | 7/2003 | Bowker et al. | |
| 6,606,642 B2 | 8/2003 | Ambler et al. | |
| 6,613,098 B1 | 9/2003 | Sorge et al. | |
| 6,668,354 B1 | 12/2003 | Chen et al. | |
| 6,687,873 B1 * | 2/2004 | Ballantyne et al. | 715/500 |
| 6,728,685 B1 | 4/2004 | Ahluwalia | |
| 6,753,889 B1 | 6/2004 | Najmi | |
| 6,772,206 B1 | 8/2004 | Lowry et al. | |
| 6,775,680 B2 | 8/2004 | Ehrman et al. | |
| 6,799,299 B1 | 9/2004 | Li et al. | |
| 6,889,360 B1 | 5/2005 | Ho et al. | |
| 6,901,403 B1 | 5/2005 | Bata et al. | |
| 6,901,430 B1 | 5/2005 | Smith | |
| 6,904,598 B2 | 6/2005 | Abileah et al. | |
| 6,907,564 B1 | 6/2005 | Burchhardt et al. | |
| 6,909,903 B2 | 6/2005 | Wang | |
| 6,910,216 B2 | 6/2005 | Abileah et al. | 719/319 |
| 6,912,719 B2 | 6/2005 | Elderon et al. | |
| 6,915,523 B2 | 7/2005 | Dong et al. | |
| 6,948,117 B2 | 9/2005 | Van Eaton et al. | |
| 6,948,174 B2 | 9/2005 | Chiang et al. | |
| 6,952,717 B1 | 10/2005 | Monchilovich et al. | |
| 6,964,053 B2 | 11/2005 | Ho et al. | |
| 6,971,096 B1 | 11/2005 | Ankireddipally et al. | |
| 6,980,963 B1 | 12/2005 | Hanzek | |
| 7,000,238 B2 | 2/2006 | Nadler et al. | |
| 7,013,306 B1 * | 3/2006 | Turba et al. | 707/101 |
| 7,024,413 B2 | 4/2006 | Binding et al. | |
| 7,043,687 B2 | 5/2006 | Knauss et al. | |
| 7,051,032 B2 | 5/2006 | Chu-Carroll et al. | |
| 7,054,901 B2 | 5/2006 | Shafer | |
| 7,069,291 B2 | 6/2006 | Graves et al. | |
| 7,080,092 B2 | 7/2006 | Upton | |
| 7,111,011 B2 | 9/2006 | Kobayashi et al. | |
| 7,120,645 B2 | 10/2006 | Manikutty et al. | |
| 7,120,702 B2 | 10/2006 | Huang et al. | |
| 7,124,299 B2 | 10/2006 | Dick et al. | |
| 7,134,075 B2 | 11/2006 | Hind et al. | |
| 7,143,190 B2 | 11/2006 | Christensen et al. | |
| 7,152,205 B2 | 12/2006 | Day et al. | |
| 7,266,582 B2 | 9/2007 | Stelting | |
| 7,296,229 B2 | 11/2007 | Junkermann | |
| 2001/0014900 A1 | 8/2001 | Brauer et al. | |
| 2001/0047311 A1 | 11/2001 | Singh | |
| 2002/0010716 A1 | 1/2002 | McCartney et al. | |
| 2002/0035583 A1 | 3/2002 | Price et al. | |
| 2002/0038336 A1 | 3/2002 | Abileah et al. | |
| 2002/0042849 A1 | 4/2002 | Ho et al. | |
| 2002/0046294 A1 | 4/2002 | Brodksy et al. | |
| 2002/0049815 A1 | 4/2002 | Dattatri | |
| 2002/0056012 A1 | 5/2002 | Ableah et al. | 709/310 |
| 2002/0059344 A1 | 5/2002 | Britton et al. | |
| 2002/0078010 A1 | 6/2002 | Ehrman et al. | |
| 2002/0078255 A1 | 6/2002 | Narayan | |
| 2002/0083099 A1 | 6/2002 | Knauss et al. | |
| 2002/0099735 A1 | 7/2002 | Schroeder et al. | |
| 2002/0100027 A1 | 7/2002 | Binding et al. | 717/137 |
| 2002/0111989 A1 | 8/2002 | Ambler et al. | |
| 2002/0116454 A1 | 8/2002 | Dyla et al. | |
| 2002/0133569 A1 | 9/2002 | Huang et al. | |
| 2002/0143820 A1 | 10/2002 | Van Eaton et al. | |
| 2002/0160745 A1 | 10/2002 | Wang | |
| 2002/0161801 A1 | 10/2002 | Hind et al. | 707/513 |
| 2002/0174340 A1 | 11/2002 | Dick et al. | 713/178 |
| 2002/0178290 A1 | 11/2002 | Coutthard et al. | 709/246 |
| 2002/0178299 A1 | 11/2002 | Teubner | |
| 2002/0188688 A1 | 12/2002 | Bice et al. | |
| 2002/0194227 A1 | 12/2002 | Day et al. | 707/523 |
| 2002/0198974 A1 | 12/2002 | Shafer | |
| 2003/0004746 A1 | 1/2003 | Kheirolomoom et al. | |
| 2003/0007397 A1 | 1/2003 | Kobayashi et al. | 365/200 |
| 2003/0065623 A1 | 4/2003 | Cornell et al. | 705/64 |
| 2003/0074217 A1 | 4/2003 | Beisiegel et al. | |
| 2003/0081002 A1 | 5/2003 | De Vorchik et al. | |
| 2003/0093403 A1 | 5/2003 | Upton | |
| 2003/0093436 A1 | 5/2003 | Brown et al. | |
| 2003/0093468 A1 | 5/2003 | Gordon et al. | |
| 2003/0093500 A1 | 5/2003 | Khodabakchian et al. | |
| 2003/0120730 A1 | 6/2003 | Kuno et al. | |
| 2003/0159111 A1 * | 8/2003 | Fry | 715/513 |
| 2003/0163585 A1 | 8/2003 | Elderon et al. | |
| 2003/0204460 A1 | 10/2003 | Robinson et al. | |
| 2003/0212686 A1 | 11/2003 | Chu-Carroll et al. | |
| 2004/0006739 A1 | 1/2004 | Mulligan | |
| 2004/0024820 A1 | 2/2004 | Ozzie et al. | |
| 2004/0054969 A1 | 3/2004 | Chiang et al. | |
| 2004/0054970 A1 | 3/2004 | Chiang et al. | |
| 2004/0064466 A1 | 4/2004 | Manikutty et al. | 707/100 |
| 2004/0103370 A1 | 5/2004 | Chiang et al. | |
| 2004/0111464 A1 | 6/2004 | Ho et al. | |
| 2004/0205731 A1 | 10/2004 | Junkerman | 717/136 |
| 2004/0221292 A1 | 11/2004 | Chiang | |
| 2004/0237034 A1 | 11/2004 | Chiang et al. | |
| 2005/0050228 A1 | 3/2005 | Perham et al. | |
| 2005/0091639 A1 | 4/2005 | Patel | |
| 2005/0166209 A1 | 7/2005 | Merrick et al. | |
| 2005/0171970 A1 | 8/2005 | Ozzie et al. | |
| 2005/0203944 A1 | 9/2005 | Dinh et al. | |
| 2005/0210414 A1 | 9/2005 | Angiulo et al. | |
| 2006/0265478 A1 | 11/2006 | Chiang et al. | |
| 2007/0083524 A1 | 4/2007 | Fung et al. | |
| 2007/0094283 A1 | 4/2007 | Fung et al. | |

FOREIGN PATENT DOCUMENTS

| | | |
|---|---|---|
| WO | WO 01/67290 A2 | 9/2001 |

OTHER PUBLICATIONS

Diaz et al., Inter-Organizational Document Exchange-Facing the Conversion Problem with XML, ACM 2002, pp. 1043-1044.

Arndt et al., An XML-Based Approach to Multimedia Software Engineering for Distance Learning, ACM 2002, pp. 525-532.

Glushko et al., An XML Framework for Agent-Based E-Commerce, ACM Mar. 1999, pp. 106-114.

"NetDynamics, PAC for IMS" User guide, Precise Connectivity Systems, 1998.

UML™ for EAI. UML™ Profile and Interchange Models for Enterprise Application Integration (EAI). OMG document No. ad/2001-09-17.

Dymetman et al., XML and Multilingual Document Authoring: Convergent Trends, ACM Jul. 2000, pp. 243-249.

PR Newswire, XMLSolutions Delivers XML-based Prototype for Envera Marketplace, ProQuest, Apr. 2000, pp. 1-3.

Suzuki et al., Managing the Software Design Documents with XML, ACM 1999, pp. 127-136.

Stieren, SSt: Using Signle-sourcing, SGML, and Teamwork for Documentation, ACM 1999, pp. 45-52.

"Requirements for Building Industrrial Strength Web Services: The Service Broker", http://www.theserverside.com/tt/articles/article.tss?l=Service-Broker (Jul. 2001).

"IMS Primer", Long et al. IBM. International Technical Support Org. Jan. 2000.

"Web Services Description Language" (WSDL) 1.1'Mar. 2001, W3C.

Extensible Markup Language (XML) 1.0 (Second Edition) Oct. 2000, W3C.

'IMS Connect Guide and Reference version1', Oct. 2000, IBM.

Royappa, Implementing Catalog Clearinghouses with XML and XSL, ACM 1998, pp. 616-623.

PR Newswirek, Sterling Commerce Announces Availability of First Data Transformation Engine to Support Both XML and Traditional EDI Standards, New York, May 1999.

"Correlate IMSADF Secondary Transaction MFS Generation with the Generation of the Output Format Rule", IBM Technical Disclosure Bulletin, vol. 37, No. 18, pp. 623-624, Jun. 1984.

"Remote Execution of IMS Transactions for OS/2", IBM Technical Disclosure Bulletin, vol. 34, No. 7B, pp. 16, Dec. 1991.

"Connecting to IMS Using XML, SOAP and Web Services", Shyh-Mei F. Ho. IMS Technical Conference, Koenigswinter, Germany, Oct. 15-17, 2002.

"XML and IMS for Transparent Application Integration", Excerpt from http://www-3.ibm.com/software/data/ims/...ntations/two/lmsv7enh/HTML/indexp50.htm. IBM Corporation, 2002.

"Web Services—The Next Step In The Evolution of the Web", Excerpt from http://www-3.ibm.com/software/data/ims/...ntations/two/imsv7enh/HTML/indexp51.htm. IBM Corporation, 2002.

"Leveraging IMS Applications and Data", Excerpt from Leveraging IMS2 found at http://www-3.ibm.com/software/data/ims/...ntations/two/imsv7enh/HTML/indexp52.htm. IBM Corporation, 2002.

"What's Next in IMS Providing Integrated e-business Solutions: IMS Version 8", Excerpt from http://www-3.ibm.com/software/data/ims/...ntations/two/imsv7enh/HTML/indexp53.htm. IBM Corporation, 2002.

"IMS Follow-on Ideal for e-business", Excerpt from http://www-3.ibm.com/software/data/ims/...ntations/two/imsv7enh/HTML/index54.htm. IBM Corporation, 2002.

"IMS Information", Excerpt from http://www-3.ibm.com/software/data/ims/...ntations/two/imsv7enh/HTML/indexp55.htm. IBM Corporation, 2002.

Cronje, "Absa Uses VGR to Ensure Online Availability", www-306.ibm.com/software/data/ims/quarterly/W inter2000/winter.htm.

Jouko Jantti et al., "IMS Version 9 Implementation Guide", ibm.com/redbooks, pp. 139-143.

"IBM Mainframe," www.dmreview.com/whitepaper/WID1002720.pdf.

Component of the Week: XMI Toolkit:, Jun. 1, 2001 http://www-106.ibm.com/developerworks/library/co-cow21.html.

"MFS XML Utility Version 9.3.0 User's Guide and References", 57 pages, IBM Corporation, ftp://ftp.software.ibm.com/software/data/ims/toolit/mfswebsupport/mfsxml-v3.pdf, 2003.

Blackman, "IMS eBusiness Update", IMS Roadshow, 11 pages, IBM Corporation, http://www-306ibm.com.software/data/ims/shelf/presentation/oneday/IMSeBusinessUpdate2003.pdf, 2003.

Microsoft Corp, Computer Dictionary, Third Edition, Microsoft Press, 1997, p. 371.

Starkey, "XML-Based Templates for Generating Artifacts from Java-Based Models," Research Disclosure, Dec. 1998, pp. 1678-1680.

"IMS Connector for Java, User's Guide and Reference", IBM VisualAge for Java, Version 3.5, 9 pages, IBM.

"HostBridge and WebSphere: Integrating CICS with IBM's Application Service," A HostBridge White Paper, Jul. 23, 2002, pp. 1-34.

"S1215, WWW,IMS or Websphere Working with IMS," Ken Blackman, 39 pp. (date unknown).

"Attunity Connect for Mainframe, Native OS/390 Adapters to Data and Legacy," 2003, pp. 1-3.

"Learning Management Systems XML and Web Services," Finn Gronbaek, IBM Corporation, copyright 2001, Apr. 20, 2003, pp. 1-29.

"Application Development/Enablement," http://www.306.ibm.com/software/data/ims/presentation/five/trends2003/HTML/indexp15.htm Nov. 11, 2003, 3 pages.

Cover, Editor, Web Services for Interactive Applications (WSIA). [Web Services Component Model (WSCM)], http://xml.coverpages.org/wscm, Dec. 21, 2002, printed Oct. 31, 2007, 4 pages.

Jantti, "Solutions for IMS Connectivity", Abridged from " IMS Connectivity in an On Demand Environment: A Practical Guide to IMS Connectivity" redbook (SG246794), 15 pages, (referred to as "http://www,-1.ibm.com/support/docview.wss?uid=swj27009204&aid=1,02/2006" U.S. Appl. No. 10/668,740.

* cited by examiner

SYSTEM AND METHOD FOR REPRESENTING MFS CONTROL BLOCKS IN XML FOR MFS-BASED IMS APPLICATIONS

This is a continuation of a U.S. patent application Ser No. 10/440,779, filed May 19, 2003, now U.S. Pat. No. 7,130,893, from which priority is claimed.

FIELD OF THE INVENTION

The present invention relates generally to computer software, and more specifically to IMS software.

BACKGROUND OF THE INVENTION

By some estimates, nearly seventy percent (70%) of corporate data in the United States and abroad resides on mainframe computers, e.g., S/390 mainframes manufactured by International Business Machines. Moreover, business-to-business (B2B) e-commerce is expected to grow at least five times faster than the rate of business-to-consumer (B2C) e-commerce. Many transactions involving this corporate data can be initiated by Windows/NT servers, UNIX servers, and other servers but the transactions must be completed on the mainframe using existing legacy applications residing thereon.

One very crucial group of legacy applications are the message format service-based information management system applications ("MFS-based IMS applications") on which many businesses depend heavily. MFS is a facility of the IMS transaction management environment that formats messages to and from many different types of terminal devices. As businesses upgrade their technologies to exploit new B2B technologies, there is a requirement for an easy and effective method for upgrading existing MFS applications to include e-business capabilities. One such e-business capability is the ability to send and receive MFS-based IMS transaction messages as extensible markup language (XML) documents.

The MFS language utility compiles MFS source code, generates MFS control blocks in a proprietary format and uses the control blocks to indicate to an IMS application how input and output messages are formatted. For input messages, MFS control blocks define how a message that is to be sent by a device or remote program is mapped to an application program's input/output (I/O) area. For output messages, MFS control blocks define how the message to be sent by the application program is mapped to the device's screen or the remote program. The MFS control blocks are compiled off line from the MFS source files and are stored in the host format library by the MFS language utility.

Currently, there are four types of MFS control blocks that are used to map input and output messages between an MFS-based application program and a displayable device or remote program. Message Output Descriptors (MODs) describe the layout of the output messages that are received from an MFS-based application program. Device Output Formats (DOFs) described how MFS on-line processing formats output messages for each of the devices or remote programs with which the application communicates. Device Input Formats (DIFs) describe the formats of input messages that MFS on-line processing receives from each of the devices or remote programs with which the application communicates. Message Input Descriptors (MIDs) described how MFS on-line processing further formats input messages so that the application program can process them.

As business processes are updated to exploit new B2B technologies, there is a requirement to support B2B interchanges. However, MFS control blocks are presently coded in an IBM proprietary language format and there does not exist any way to represent MFS control blocks in XML to format XML input and output messages between MFS-based IMS applications and displayable devices, e.g., PDA or Web browsers, or remote programs. Also, it is currently problematic to save and load XML files without the existence of external references.

A non-proprietary, industry-wide standard method is needed to represent the information in today's MFS control blocks. It happens that XML is growing in acceptance as the universal data format which can be the input and output for any application. If the MFS control blocks are represented in XML, they can easily be used for developing new software to map XML messages for IMS MFS transaction applications. Using MFS control blocks in XML can encourage a wide range of connection types and tools to be developed and provide a simple and unified way to re-use existing MFS-based IMS transaction applications.

Accordingly, there is a need for a system and method for representing MFS control blocks in an industry-wide standard format. Moreover, there is a need for a system and method for allowing references to external XML files containing MFS control blocks from within a given XML file without having the external XML files present and/or created

SUMMARY OF THE INVENTION

A method for representing MFS control blocks in XML for MFS-based IMS applications includes establishing an MFS XML repository. Plural XML files representing plural MFS control blocks are stored in the MFS XML repository. Preferably, an XML request is transformed into a byte stream request based on the XML files within the MFS XML repository. The byte stream request can be processed by an MFS-based IMS application program to yield a byte stream response. Again, based on the XML files within the repository, the byte stream response is transformed into an XML response.

In a preferred embodiment, a first MFS source file is parsed and it is determined whether an unresolved external reference is encountered while parsing the first MFS source file. Based on the determination, a skeleton XML file for an externally reference control block is created. The skeleton XML file can include a present XML file name in the external control block name. Further, in a preferred embodiment a second MFS source file is parsed and it is determined whether a previously encountered externally referenced control block is again encountered while parsing the second MFS source file. Based on the determination, a previously created skeleton XML file can be populated with information from the control block.

In another aspect of the preferred embodiment of the present invention, a system for representing MFS control blocks in XML for MFS-based IMS applications includes an MFS XML adapter and an MFS XML repository connected thereto. The MFS XML repository includes plural XML files that represent plural MFS control blocks. The system further includes a computer program for representing MFS control blocks in XML for MFS-based IMS applications. In this aspect, the computer program includes logic means that can transform an XML request into a byte stream request based on the XML files in the MFS XML repository.

In yet another aspect of the preferred embodiment of the present invention, a computer program device for representing MFS control blocks in XML for MFS-based IMS applications includes logic means for receiving an XML request and logic means for transforming the XML request into a byte stream. Further, the computer program device includes logic means for placing the byte stream request in an IMS message queue.

The preferred embodiment of the present invention will now be described, by way of example, with reference to the accompanying drawings, in which:

DESCRIPTION OF AN EMBODIMENT OF THE INVENTION

Figure 1:
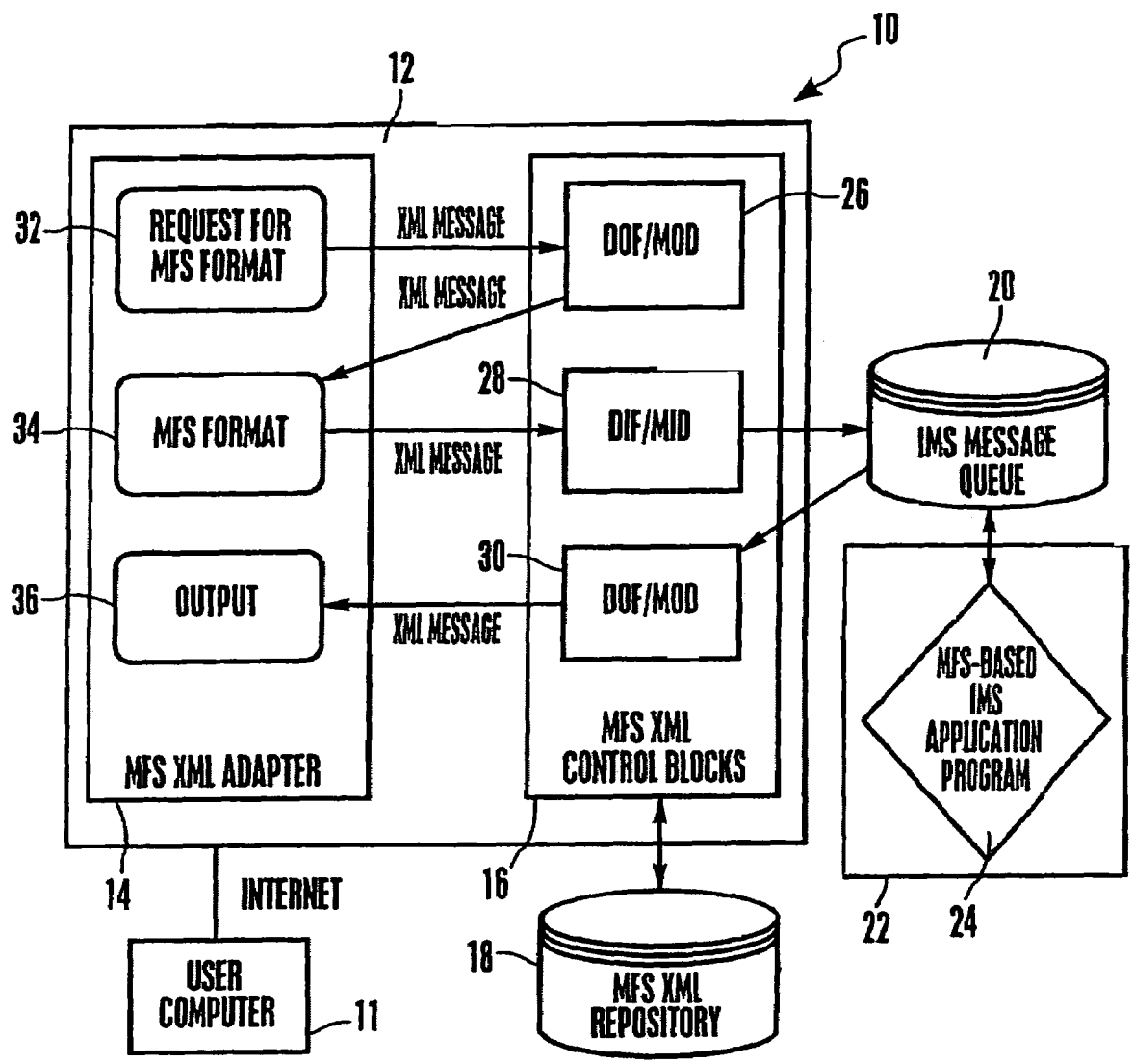
FIG. 1 is a block diagram representing the present invention.

Referring initially to FIG. 1, a block diagram of the system for facilitating XML transactions with MFS-based IMS applications is shown and is generally designated 10. FIG. 1 shows that the system 10 includes a user computer 11 connected, e.g., via the Internet to a first server 12. Within the first processor 12, is an MFS XML adapter 14 that communicates with MFS XML control blocks 16 that are retrieved from an MFS XML repository 18. In a preferred embodiment, the MFS XML adapter 14 is the software-implemented MFS XML adapter that is executed within the first processor 12 and that is discussed in U.S. patent application Ser. No. 10/244,722, incorporated herein by reference. It is to be understood that the MFS XML adapter 14 includes a mapper which maps the XML document pertaining to the device information into the appropriate MFS XML messages (and vice versa). Also, the MFS XML adapter 14 includes a converter that transforms the MFS XML messages into a byte stream and vice versa. The MFS importer reads and parses MFS source files for a particular application and generates XML files that describe the MFS-based application interface using the MFS Metamodel discussed in U.S. patent application Ser. No. 09/849,105, incorporated herein by reference, which is part of the Common Application Metamodel (CAM) disclosed in U.S. Provisional Application Ser. No. 60/223,671, also incorporated herein by reference.

FIG. 1 shows that the MFS XML adapter 14 communicates with an IMS message queue 20 which, in turn, communicates with a second server 22 that hosts an MFS-based IMS application program 24. An MFS-based IMS application program 22 can, e.g., be a program for tracking inventory. Further, as shown in FIG. 1 and stated above, the MFS XML adapter 14 communicates with the MFS XML repository 18 in order to retrieve the necessary XML control blocks 16 for message formatting. Preferably, a first XML control block for DOF/MOD 26, an XML control block for DIF/MID 28, and a second XML control block for DOF/MOD 30 are retrieved from the MFS XML repository 18. Moreover, as described in detail below, the MFS XML adapter 14 provides a request for MFS format 32 to the MFS XML repository 18. The MFS adapter 14 retrieves an MFS format 34 from the MFS XML repository 18 and later returns the output 36.

It can be appreciated that the present invention groups MID and DIF files together as one XML control block and groups MOD and DOF files together as another control block. These groupings reduce the load time of XML files during execution. Moreover, the generated XML files for IMS control blocks can be stored in the MFS XML repository 18, as described above. Unlike the existing MFS format library, which must be closely coupled to the host processor where the MFS-based IMS application 24 resides, the MFS XML repository 18 containing the MFS control blocks in XML does not have to be tied to the same host processor in which the MFS-based IMS application 24 resides. The MFS XML repository 18 can reside in any processor, including a Windows-based processor, in which the MFS XML Adapter 14 resides. A local file system, or a database repository, e.g., DB2's XML repository, or an z/OS partitioned data set can be used as the MFS XML repository 18.

It is to be understood that in the system 10 described above, the logic of the present invention can be contained on a data storage device with a computer readable medium, such as a computer diskette. Or, the instructions may be stored on a magnetic tape, hard disk drive, electronic read-only memory (ROM), optical storage device, or other appropriate data storage device or transmitting device thereby making a computer program product, i.e., an article of manufacture according to the invention. In an illustrative embodiment of the invention, the computer-executable instructions may be lines of C++ compatible code.

The flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program elements in a form that instructs a digital processing apparatus (that is, a computer) to perform a sequence of function steps corresponding to those shown.

Figure 2:
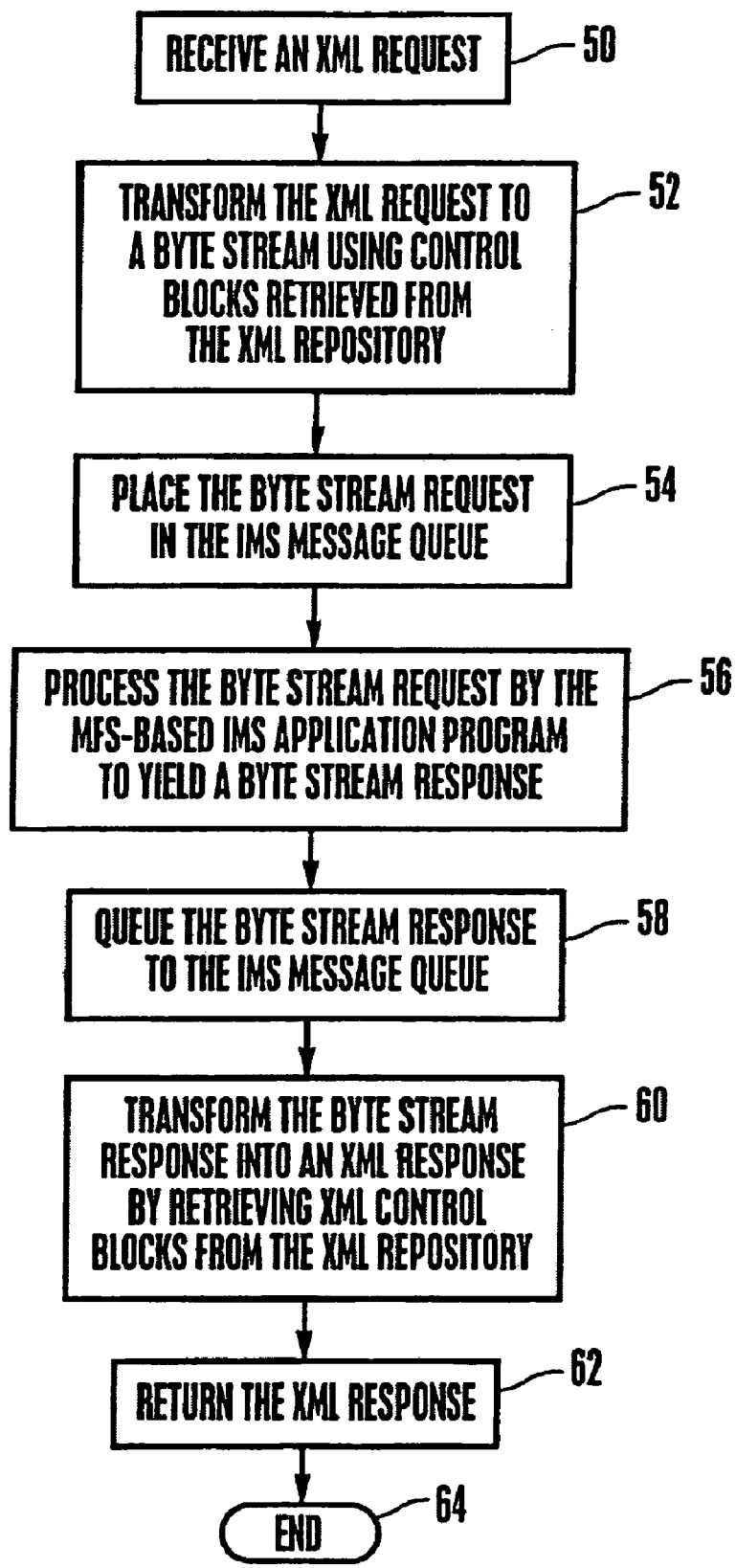
FIG. 2 is a flow chart of the overall logic of the present invention.

Referring now to FIG. 2, the overall logic of the present invention is shown and commences at block 50 wherein an XML request is received, e.g., at the MFS XML adapter 14 (FIG. 1), from the user computer 11 At block 52, the XML request is transformed to a byte stream by using the XML control blocks 16 retrieved from the MFS XML repository 18 (FIG. 1). It is to be understood that in an exemplary, non-limiting embodiment the XML request is transformed as follows: a request for MFS format 32 (FIG. 1), in XML, is submitted by the MFS XML adapter 14 to the MFS XML repository 18 (FIG. 1). An XML control block for DOF/MOD 26 (FIG. 1) is retrieved to generate the MFS format 34 (FIG. 1) in XML. To complete the request, data is input to the MFS format 34 (FIG. 1) and the complete request is processed by the MFS XML adapter 14 (FIG. 1), again, in XML. An XML control block for DIF/MID 28 (FIG. 1) is used to format the XML request with the proper input format to yield a byte stream message.

Moving to block 54, the byte stream is placed in the IMS message queue 20 (FIG. 1). At block 56, the byte stream is processed by the MFS-based IMS application program 24 (FIG. 1) to yield a byte stream response. Continuing to block 58, the byte stream response is queued to the IMS message queue 20 (FIG. 1). Next, at block 60, the byte stream response is transformed into an XML response by retrieving the control blocks from of the MFS XML repository 18 (FIG. 1). For example, the byte stream request is returned to the MFS XML, adapter 14 (FIG. 1) where an XML control block for DOF/MOD 30 (FIG. 1) is used to determine the format of byte stream request in order to generate an XML response message. Returning to the description of the logic, the XML response message is returned, e.g., to the MFS XML adapter 14 (FIG. 1) and then the user computer 11. The logic then ends at state 64.

It is to be understood that XML files containing MFS control blocks represent all of the application interface information encapsulated by the MFS source—including the input and output messages, display information, MFS flow control, device characteristics and operation semantics. From these types of XML files, the MFS XML adapter 14 (FIG. 1) maps XML messages into the proper format for MFS-based IMS applications. Thus, MFS-based IMS applications can be retargeted to support B2B XML communications without changing the MS transaction itself. Additionally, a variety of displayable devices not yet supported by MFS, including web browsers, can be supported.

Another aspect of the present invention is to reference non-existent information across different MFS source files. When an MFS control block is represented as an XML file, a forward reference problem occurs in generating XML for these control blocks because XML files, when loaded or saved, require external references to exist However, this is not always possible or convenient. For example, when generating an XML file containing a MID control block from an MFS source file, the MID statement often has a reference to a MOD defined in another MFS source file. The external reference to the MOD must be recorded. However, this is not possible within XML unless this external reference already exists, which would require creating an XML file out of the external MOD before creating an XML file out of the MID. In the case in which an external MOD points to a MID which, in turn, points back to the original MOD, the XML file containing the control blocks cannot be generated because of the circular condition.

One possible solution to solve this forward reference problem in XML is to combine all original MFS sources into one large file for XML creation. Unfortunately, since most companies often have thousands of MFS source files, this is not feasible. Also, if one MFS file is changed, it requires regeneration of all XML files for all of the control blocks.

Figure 3:
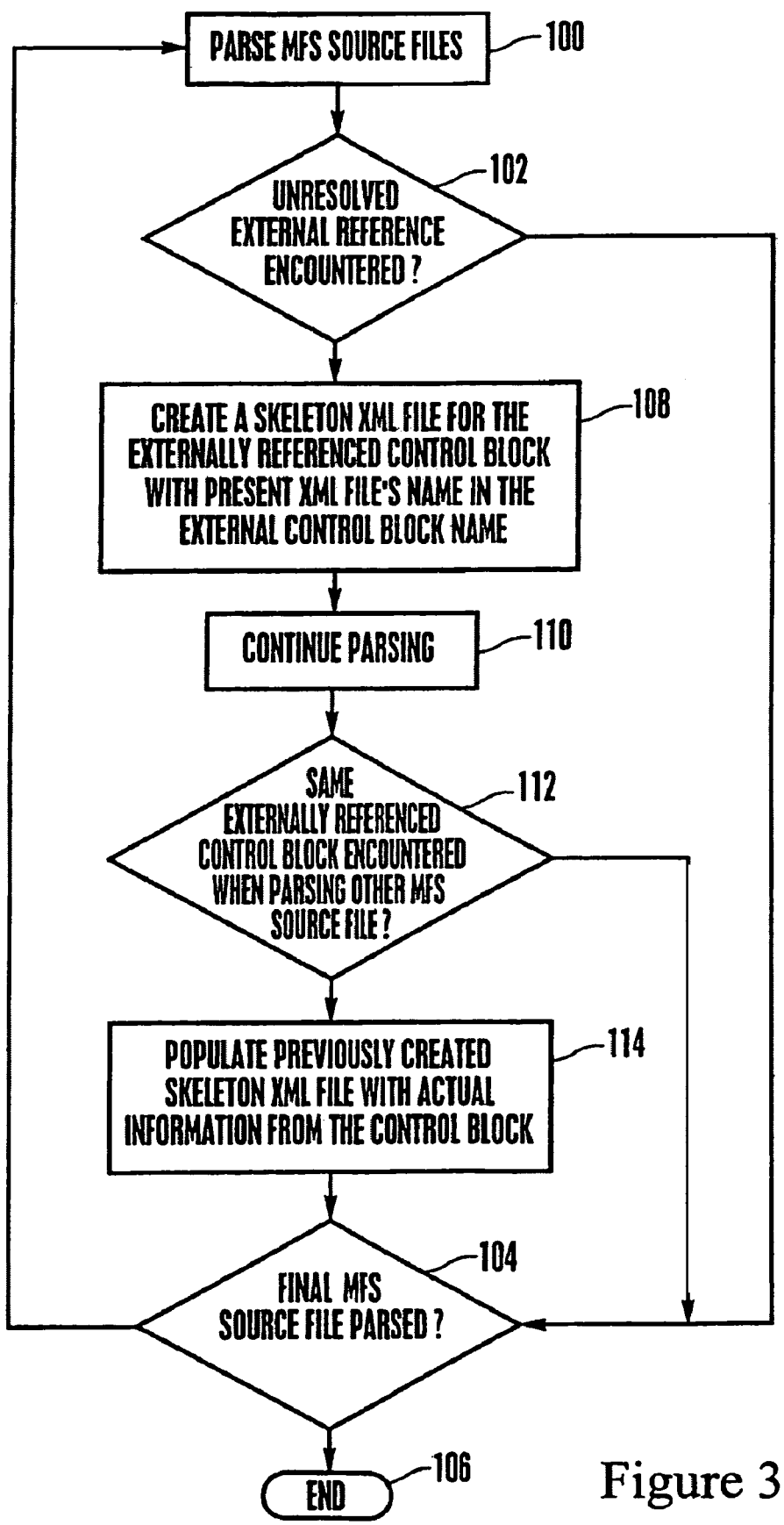
FIG. 3 is a flow chart of the MFS source file parsing logic.

Referring to FIG. 3, the MFS source file parsing logic, including the solution to the above-mentioned forward reference problem, is shown and commences at block 100. At block 100, MFS source files are parsed. Moving to decision diamond, it is determined whether an unresolved external reference has been encountered. If not, the logic moves to decision diamond 104 where it is determined whether the final MFS source file has been parsed. If the final MFS source file has been parsed, the logic ends at state 106. Otherwise, the logic returns to block 100 and continues as described above.

Returning to decision diamond 102, if an unresolved external reference has been encountered, the logic moves to block 108 where a skeleton XML file is created for the externally referenced control block with the present XML file's name in the external control block name. Thereafter, at block 110 the parsing of MFS source files continues. Proceeding to decision diamond 112, it is determined whether the same externally referenced control block has been encountered when parsing another MFS source file. If not, the logic moves to decision diamond 104 and continues as described above. Otherwise, the logic continues to block 114, where the previously created skeleton XML file is populated with actual information from the control block, and no changes are necessary to the files which referenced them. The logic then moves to decision diamond 104 and continues as described above.

It can be appreciated that this invention satisfies the external references in an given XML file by generating skeleton XML files as place holders with the appropriate filenames and empty top-level entity. Therefore, reloading existing XML files to check if they have potential references to newly generated XML files is not required.

With the configuration of structure described above, it is to be appreciated that system and method described above provides a means for representing MFS control blocks in an industry-wide standard format. Moreover, it provides a system and method for allowing references to external XML files containing MFS control blocks from within a given XML file without having the external XML files present and/or created.

While the particular SYSTEM AND METHOD FOR REPRESENTING MFS CONTROL BLOCKS IN XML FOR MFS-BASED IMS APPLICATIONS as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A method for representing MFS control blocks in XML for MFS-based IMS applications, comprising the acts of:
    establishing an MFS XML repository having at least one XML file representing at least one MFS control block;
    at least partially based on the XML file, transforming an XML request into a byte stream request;
    processing the byte stream request with an MFS-based IMS application program to yield a byte stream response;
    at least partially based on the XML file, transforming the byte stream response into an XML response;
    parsing a first MFS source file; and
    determining whether an unresolved external reference is encountered while parsing the first MFS source file.

2. A system for representing MFS control blocks in XML for MFS-based IMS applications, comprising:
    an MFS XML adapter;
    an MFS XML repository connected to the MFS XML adapter, the MFS XML repository including at least one XML file representing at least one MFS control block;
    a computer program for representing MFS control blocks in XML for MFS-based IMS applications, the computer program comprising: logic means for transforming an XML request into a byte stream request at least partially based on the MFS control block within the MFS XML repository; wherein the XML file is at least one of the following: an XML file for device output format/message output descriptors (DOF/MOD) and an XML file for device input format/message input descriptors (DIF/MID), and wherein the computer program further comprises:

logic means for processing the byte stream request with an MFS-based IMS application program to yield a byte stream response;

logic means for transforming the byte stream response into an XML response at least partially based on the files in the MFS XML repository;

logic means for parsing an first MFS source file; and logic means for determining whether an unresolved external reference is encountered while parsing the first MFS source file.

3. The system of claim 2, wherein the computer program further comprises:

logic means for parsing a second MFS source file; and logic means for determining whether a previously encountered externally referenced control block is again encountered while parsing the second MFS source file.

4. A computer program device for representing MFS control blocks in XML for MFS-based IMS applications, comprising:

logic means for establishing an MFS XML repository having at least one XML file representing at least one MFS control block; and logic means for transforming an XML request into a byte stream request at least partially based on the XML file;

logic means for parsing a first MFS source file; and logic means for determining whether an unresolved external reference is encountered while parsing the first MFS source file.

* * * * *